Figures 1, 2:
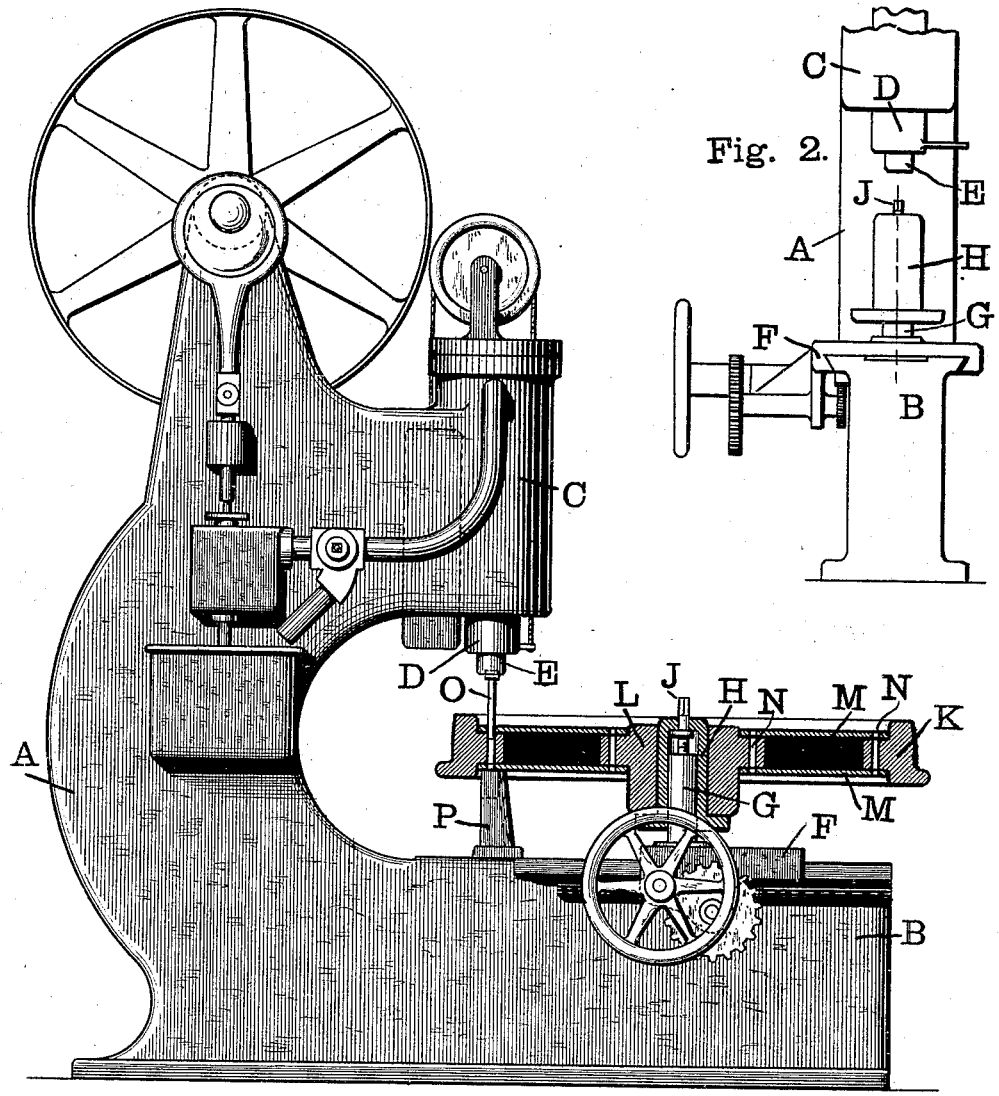

R. KELLS.
CAR WHEEL RIVETING MACHINE.

No. 369,643. Patented Sept. 6, 1887.

Witnesses:

Ross Kells
Inventor
by James W. See
Attorney

UNITED STATES PATENT OFFICE.

ROSS KELLS, OF CLEVELAND, OHIO, ASSIGNOR TO THE PAIGE CAR WHEEL COMPANY, OF SAME PLACE.

CAR-WHEEL-RIVETING MACHINE.

SPECIFICATION forming part of Letters Patent No. 369,643, dated September 6, 1887.

Application filed July 5, 1887. Serial No. 243,322. (No model.)

*To all whom it may concern:*

Be it known that I, ROSS KELLS, of Cleveland, Cuyahoga county, Ohio, have invented certain new and useful Improvements in Car-Wheel Machines, of which the following is a specification.

There is a well-known class of car-wheels of composite type formed of a tire and hub united by disks bolted or riveted to appropriate flanges upon the tire and hub, there being a circle of the bolts or rivets where the disks join the tire and another circle where the disks join the hub.

My invention has reference to a machine for forcing the bolts or rivets in place in these disks and flanges, the machine being also applicable to thus placing bolts or rivets in circles in other but somewhat analogous construction of car-wheels or other articles.

My improvements will be readily understood from the following description, taken in connection with the accompanying drawings, in which—

Figure 1 is a side elevation of a machine illustrating my improvements, the car-wheel being operated upon and the bushing which supports the car-wheel appearing in vertical diametrical section; and Fig. 2, a front view of the main portions of the machine with the car-wheel omitted.

In the drawings, A indicates the frame of the machine, the same consisting, substantially, of a rigid column; B, a rigid base projecting forwardly from the column and provided upon its top with a slideway similar to the shears of a lathe; C, the cylinder of a hydraulic press, firmly supported by the column over an intermediate point in the length of the base; D, the ram of the hydraulic press, projecting downward from the cylinder; E, a die at the lower end of the ram, this die having a face adapted to properly engage the head of one of the bolts or rivets employed; F, a saddle similar to a lathe-saddle, fitted to slide upon the top of the base, and preferably fitted with mechanism for traversing it upon the base similar to a lathe-saddle; G, a vertical stud rigidly supported by and projecting upward from the saddle; H, a bushing fitting upon this stud and capable of vertical movement thereon, and having exterior diameter adapted for the bore of the car-wheels being operated upon, this bushing having also at its lower end a projecting flange to serve in supporting a car-wheel which may be placed upon the bushing; J, a screw engaging the stud and bushing and serving as a means by which the bushing may be adjusted vertically upon the stud; K, the tire of the composite car-wheel; L, the hub of the car-wheel; M, the two disks uniting the tire and hub and engaging opposite sides of flanges projecting inwardly and outwardly, respectively, from the tire and hub; N, bolt or rivet holes through the disks and flanges; O, one of the bolts or rivets by which the disks are secured in place, the intention being that these bolts or rivets shall be a tight fit in the holes N; and P, a counter-die standing upon the top of the base directly beneath the die E, and reaching from the base upward to the under disk of the car-wheel, the intention being that this counter-die shall have a cavity in its top to permit the downward projection of the end of the bolt or rivet when the same is forced into place in case the counter-die is used directly under the bolt-head, this cavity being of course unnecessary in case the counter-die is located to one side of the bolt-hole.

The press by which the die E is forced downward is illustrated as being of the hydraulic type, though of course other pressing means may obviously be employed. The hydraulic press is preferable, and is of course to be provided with water-forcing means, counter-balance for the ram, and other needful accessories of a hydraulic press.

The operation of the machine is as follows, the ram of the press being in its upper position: A bushing, H, is chosen to suit the bore of wheels being operated upon, and is placed upon the stud G and vertically adjusted by means of the screw J, so that the car-wheel when in place upon the bushing will be supported by the lower flange of the bushing in such vertical position that the lower plate will properly rest upon the top of the counter-die. The saddle is then adjusted along the top of the base until the die E will correspond with, say, the outer circle of holes N. The bolts or rivets are then stuck in their holes as far as possible by hand. The wheel is then rotated until one of the bolts comes under the die E, and the press is then set in motion, the result being that the die E forcibly descends and presses the bolt or rivet properly into place. The pressure is then removed and the ram allowed to ascend, after which the wheel is rotated to bring another bolt under the die, and so on and on. When all of the bolts of the outer circle have been thus forced into place, the saddle is moved inward until the die E corresponds with the heads of the bolts of the inner circle of bolts, and the forcing process is repeated, as before.

I claim as my invention—

1. In a car-wheel machine, the combination, substantially as set forth, of a frame, a base thereto provided with a slideway, a saddle fitted to slide thereon and provided with an upwardly-projecting support adapted to engage the bore of a car-wheel, and pressing mechanism, as a hydraulic cylinder and ram, supported by the frame over the base, and a counter-die supported by the base below such pressing mechanism.

2. In a car-wheel machine, the combination, substantially as set forth, of a column provided with a projecting base having a slideway and supporting a hydraulic cylinder above the base, a ram projecting downward from such hydraulic cylinder, a counter-die upon the base below said ram, a saddle fitted to slide upon the base, and a support projecting upwardly from said saddle and adapted for engagement with the bore of a car-wheel.

ROSS KELLS.

Witnesses:
J. R. FISHER,
W. H. SILVERTHORN.